United States Patent [19]

Huang

[11] Patent Number: 4,744,585
[45] Date of Patent: May 17, 1988

[54] COLLAPSIBLE BARROW WITH ADJUSTABLE WHEELS

[76] Inventor: James C. Huang, No. 105, Sec. 4, San-Ho Rd., Sanchung City, Taipei Hsien, Taiwan

[21] Appl. No.: 104,969

[22] Filed: Oct. 6, 1987

[51] Int. Cl.⁴ .............................................. B62B 1/12
[52] U.S. Cl. ................................... 280/646; 280/661; 280/673
[58] Field of Search ................... 280/40, 42, 646, 652, 280/43.1, 43.15, 43.16, 47.17, 47.18, DIG. 5, DIG. 6, 63, 661, 674, 673

Primary Examiner—John J. Love
Assistant Examiner—Richard Camby
Attorney, Agent, or Firm—Birch, Stewart, Kolasch & Birch

[57] ABSTRACT

A collapsible golf club barrow includes two wheel holding bars on which are mounted wheels through a ball-and-socket joint member. The joint member includes a ball member mounted on the shaft of each wheel and a socket member sleeved around the ball member. The socket member is welded to a bracket member which is secured to the wheel holding bar.

4 Claims, 4 Drawing Sheets

COLLAPSIBLE BARROW WITH ADJUSTABLE WHEELS

BACKGROUND OF THE INVENTION

This invention relates to a collapsible barrow, and particularly to a collapsible barrow for carrying golf clubs, having adjustable wheels.

A typical collapsible golf club barrow is schematically shown in FIGS. 1, 2 and 3, including a a longitudinal bar 10 having a front end connected with a handle 11 and a rear end on which is mounted a carriage 12. Two wheel holding bars 13 are interconnected pivotally at one of their ends and two wheels 14 are mounted on the other ends of the wheel holding bars. Two links 15 are employed to interconnect the longitudinal bar and the wheel holding bars. When the handle is stretched to its operating position, the two links cause the wheel holding bars to stretch out, thereby placing the wheel holding bars in a position transverse to the longitudinal bar. When the handle is folded, the wheel holding bars are also folded. In this barrow, the shaft of each wheel is connected to each wheel holding bar by providing a bracket which is welded to the shaft and rivetted to the support as shown in FIG. 3. Since the collapsible frame of the barrow is accomplished by using a number of rivet joints, welded joints and screw joints, it is difficult to control the dimensions between the joints of the barrow in manufacturing. The inaccurate dimensions between the joints may cause the position of the wheels to deviate from a proper alignment such as that shown by dotted lines in FIG. 1. In some cases, the deviation of the wheels may render the wheels unable to operate properly. Since the shafts of the wheels are fixed relative to the holding bars, it is impossible to adjust the position of the wheels when the wheels are not in proper position. Moreover, such a barrow requires a large package, since the wheels can not be detached from the holding bars.

SUMMARY OF THE INVENTION

An object of the invention is to provide a collapsible barrow with wheel assemblies which can be adjusted in position relative to the wheel holding bar.

According to the present invention, a golf club barrow has a collapsible frame which includes two wheel holding bars on which are mounted wheels through ball-and-socket joint means. The means includes a ball member mounted on the shaft of each wheel and a socket member sleeved around the ball member. To the socket member is welded a bracket member which is secured to the wheel holding bar.

The present exemplary preferred embodiment will be described in detail with reference to the accompanying drawings, in which:

DETAILED DESCRIPTION OF THE PREFERRED EMBODIMENT

Figure 1:
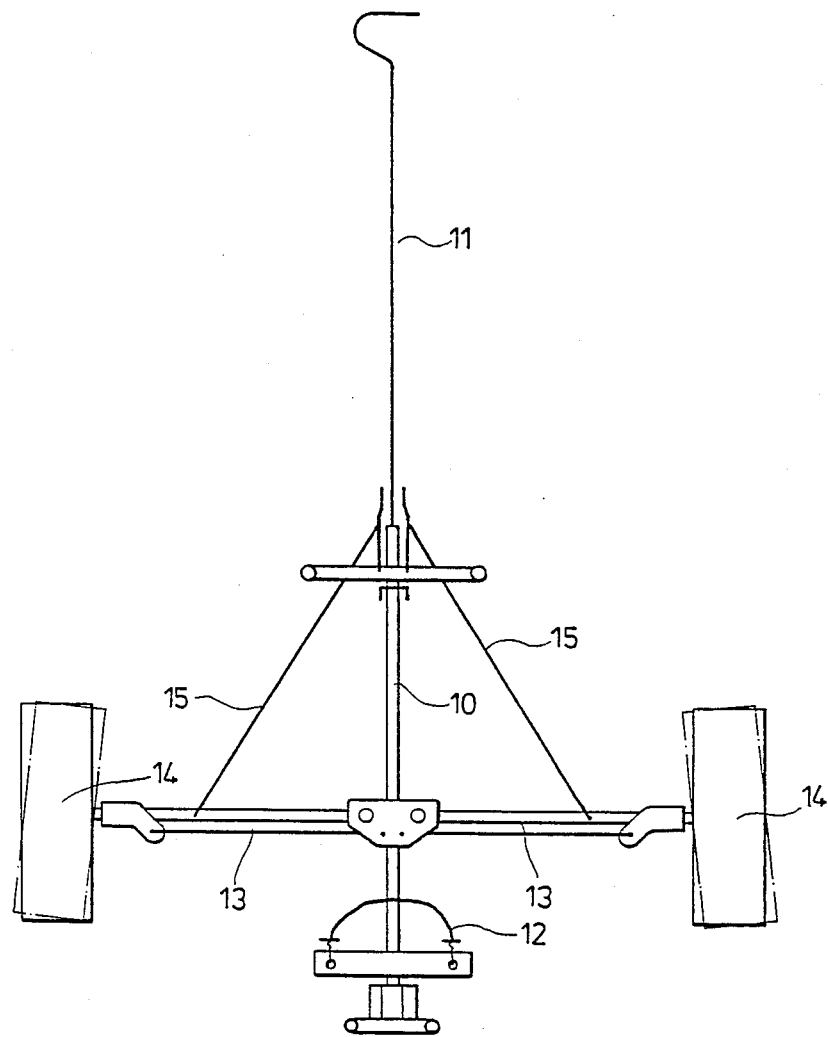
FIG. 1 is a schematic plan view of a golf club barrow in the prior art.
Figure 2:
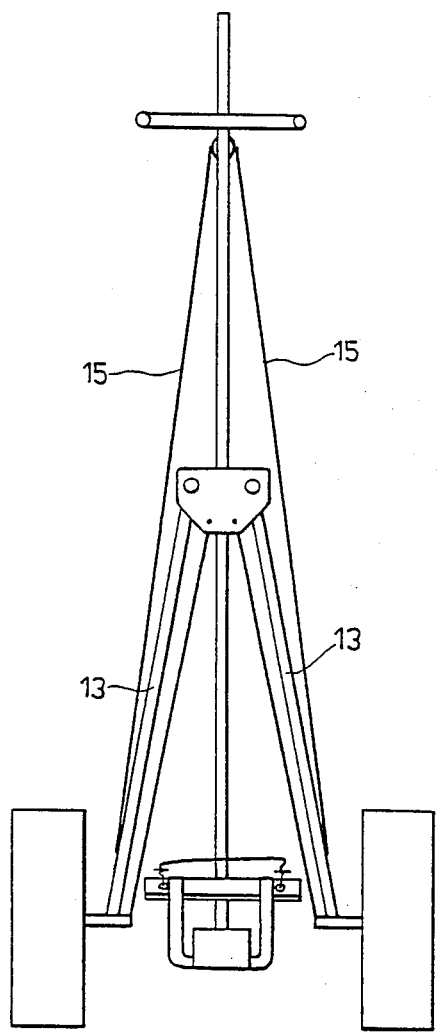
FIG. 2 is a schematic elevation view of the golf club barrow of FIG. 1.
Figure 3:
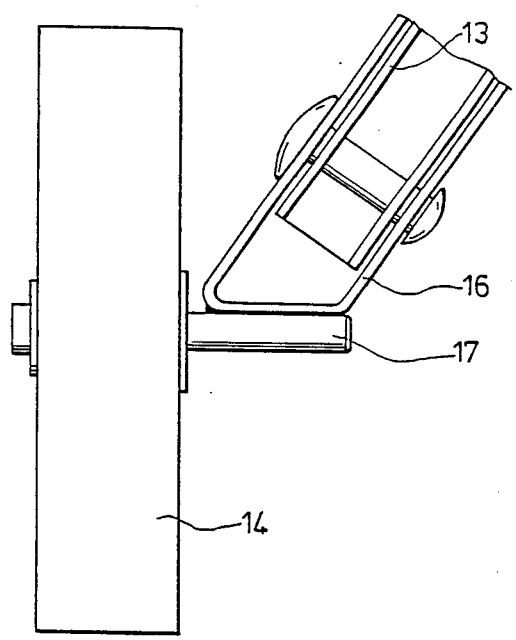
FIG. 3 is a schematic view showing the connection between a wheel and a support of the barrow of FIG. 1.
Figure 4:
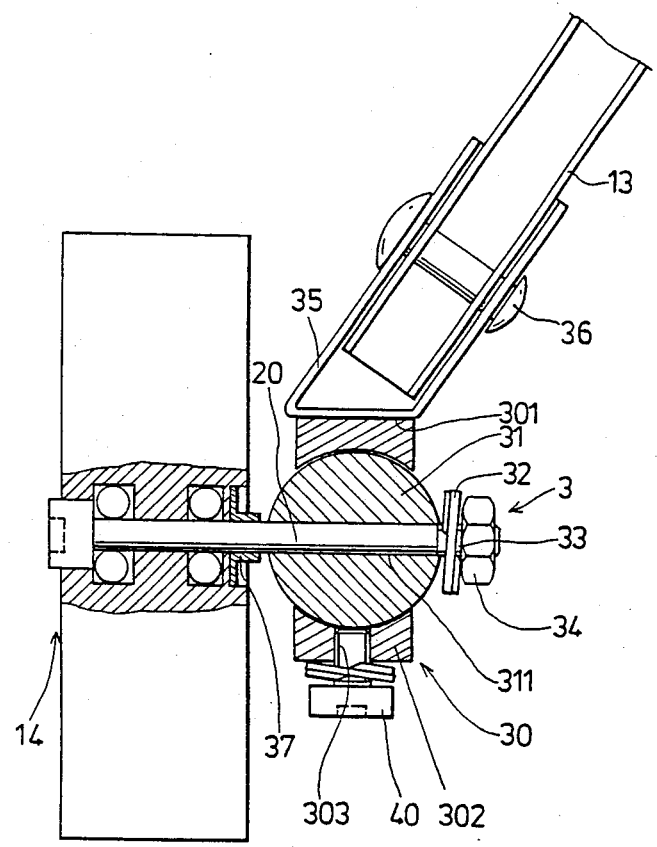
FIG. 4 is a fragmentary sectional view showing the connection between the wheel and the support according to the present invention.

A preferred embodiment of the present invention will be illustrated hereinunder with reference to FIG. 4 in combination with FIGS. 1 and 2. The collapsible frame of the barrow of this embodiment is similar to that of the prior barrow of FIG. 1. The feature of the invention resides in the joints between the wheel holding bars 13 and the wheels 14.

As is shown in FIG. 4, each wheel 14 has a shaft 20 which extends inwardly. The inwardly extending portion of each shaft 20 is inserted in an axial hole 311 of a ball member 31. The ball member 31 is fixed to the shaft 20 by means of a clamping nut 34 which engages with a screw thread 33 of the shaft 22 and packing rings 32 and 37. The ball member 31 is inserted into a hole of a socket member 30. The socket member 30 is provided with a screw hold 303 on its lower side 302. An adjustment screw 40 is threaded into the hole 303 until its end abuts with the surface of the ball member, thereby preventing the socket member 30 from moving relative to the ball member 30. Preferably, the outer surface of the ball memer is roughened such as by embossing so as to improve the engagement between the ball member and the inner surface of the socket member. The socket member 30 is welded to a bracket 35 which in turn is connected to the wheel holding arm 13 through a rivet 26.

It can be appreciated that, according to the present invention, the wheel 14 can be changed in position relative to the wheel holding bar 13 by adjusting the position of the socket member 30 relative to the ball member 31. The adjustment of the socket member 30 can be performed by loosening the screw 40 and moving the socket member 30 relative to the ball member. The adjustability of the wheel 14 can alleviate the possible problem of the disaligning of the wheels. In addition, the wheels 14 can be detached from the wheel bars 13 by detaching the nuts 34 from the shaft 20. This is advantageous for allowing the compact packing of the barrow for transportation.

With the invention thus explained, it is apparent that various modifications and variations can be made without departing from the scope of the invention. It is therefore intended that the invention be limited as indicated in the appended claims.

What I claim is:

1. A collapsible golf club barrow comprising:
    a longitudinal bar having a front end and a rear end;
    a rear carriage connected to said rear end;
    a handle connected pivotally to said front end;
    two wheel holding bars having first ends which are interconnected pivotally and second ends opposite to said first ends,
    two links each of which has one end connected pivotally and slideably to said longitudinal bar near said front end of said longitudinal bar and an opposite other end connected to each of said wheel holding bars near said second end of each of said wheel holding bar;
    two wheels each of which has a shaft with a portion extending out of said wheel to be connected to said second end of each of said wheel holding bars,
    a substantially spherical member secured to said extending portion of each of said shafts and having an axial hole through which each said shaft is inserted;
    a socket member connected to said second end of each of said wheel holding bars and sleeved around and secured adjustably to each of said spherical members; and locking members adjustably fixing said socket members to respective ones of said spherical members.

2. A collapsible golf club barrow as claimed in claim 1, wherein said locking means is a locking screw which is threaded through said socket member to abut with said spherical member.

3. A collapsible golf club barrow as claimed in claim 1, wherein said extending portion of each of said shaft has a threaded end portion and a clamping nut engaging with said threaded end portion to hold said ball member against said wheel.

4. A golf club barrow as claimed in claim 1, wherein said ball member has an outer roughened surface.

* * * * *